(12) United States Patent
Yamaguchi

(10) Patent No.: US 7,221,628 B2
(45) Date of Patent: May 22, 2007

(54) REPRODUCING APPARATUS, REPRODUCING METHOD, REPRODUCING PROGRAM AND RECORDING MEDIUM WITH THE PROGRAM RECORDED THEREIN

(75) Inventor: Hidetoshi Yamaguchi, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 644 days.

(21) Appl. No.: 10/460,680

(22) Filed: Jun. 13, 2003

(65) Prior Publication Data

US 2004/0017996 A1    Jan. 29, 2004

(30) Foreign Application Priority Data

Jun. 13, 2002    (JP) .............................. 2002-172731

(51) Int. Cl.
*G11B 5/09* (2006.01)

(52) U.S. Cl. ................ 369/47.15; 369/47.5; 369/47.23

(58) Field of Classification Search ..................... None
See application file for complete search history.

(56) References Cited

U.S. PATENT DOCUMENTS 5,611,693 A * 3/1997 Chaya et al. ............ 434/307 A 6,954,419 B1 * 10/2005 Kimura et al. ............ 369/275.3

FOREIGN PATENT DOCUMENTS

| EP | 1 045 225 A2 | 10/2000 |
| EP | 1 045 225 A3 | 10/2000 |
| EP | 2000335320 | 12/2000 |

OTHER PUBLICATIONS

European Search Report dated Oct. 15, 2004.

* cited by examiner

*Primary Examiner*—Muhammad Edun
(74) *Attorney, Agent, or Firm*—Armstrong, Kratz, Quintos, Hanson & Brooks, LLP

(57) ABSTRACT

After the DVD-Audio (1) is set and a signal for automatic reproduction is read out, or after a signal for reproduction generated in response to an input operation by a user in an operating section (73) is recognized, whether image output on a monitor is possible or not is checked. When image output is possible, it is determined that the user can visually recognize images, the data based on the VCAP system is read and reproduced. When it is determined that the image output is not possible, it is determined that the user can not or can hardly recognize images visually, and the data based on the AOP system which can be reproduced without requiring any input operation in the operating section (73) is read our and reproduced. The processing mode for reproduction is automatically switched according to the user's situation, which insures the improved convenience in use.

7 Claims, 5 Drawing Sheets

REPRODUCING APPARATUS, REPRODUCING METHOD, REPRODUCING PROGRAM AND RECORDING MEDIUM WITH THE PROGRAM RECORDED THEREIN

BACKGROUND OF THE INVENTION

1. Field of the Invention

The present invention relates to a reproducing apparatus, a reproducing method, and a reproducing program each for reproducing data recorded in a recording medium and a recording medium recorded therein.

2. Description of Related Art

Conventionally, as a recording medium with musical data and image data recorded therein, there has been known the DVD (Digital Versatile Disc)—Audio. In relation to the reproducing apparatuses for reproducing the data recorded in this DVD-Audio, there have been known two systems: one for VCAP (Video Capable Audio Player), and the other for AOP (Audio Only Player).

The VCAP is based on the system for reproduction presuming that image data has been outputted on a display unit such as a monitor. Because of this feature, in a reproducing apparatus with the VCAP employed therein, it is essential that a display for demanding a user to carry out and input operation such as a display on the menu display or a display demanding a user to carry out various types of input operations in an image display is provided. Namely in the VCAP, even if the DVD-Audio is installed in the reproducing apparatus, when, for instance, the menu screen is displayed, the state where data reproduction is stopped may be continued, or the data reproduction may not be started until the input operation is carried out by the user.

On the other hand, the AOP is based on the system for reproduction presuming tat output of image data is not carried out. Therefore in a reproducing apparatus with the AOP employed therein, it is not always required to provide a display for demanding a user to carry out an input operation, which is a prerequisite in the VCAP. Namely, when the DVD-Audio is installed, reproduction is automatically started without providing any display on the menu screen. Therefore, the trouble that data reproduction processing is not started never occurs. In the reproduction processing based on the system for the AOP, as image data is not outputted, all of the data recorded in the DVD-Audio is not always reproduced.

The DVD reproducing apparatus mounted on a movable body such as, for instance, a vehicle has been more and more popularized. In the circumstances, when the DVD-Audio is to be reproduced with an in-vehicle DVD reproducing apparatus, it may be said that reproduction with the AOP not requiring execution of an input operation is more preferable However, in reproduction of AOP, there remain some data not reproduced as described above, the system does not always satisfy the user's demands.

SUMMARY OF THE INVENTION

A main object of the present invention is to provide a reproducing apparatus, a reproducing method, a reproducing program each capable of insuring reproduction of data recorded in a recording medium in good conditions, and a recording medium with the program recorded therein.

The reproducing apparatus according to the present invention is one for reproducing data recorded in a recording medium, and comprises a control unit capable of switching between a reproduction mode in which image data included in said data is provided as output and a reproduction mode in which image data included in said data is not provided as image data and switching the reproduction mode according to whether the image data can be provided as output on an image data display section.

The reproducing method according to the present invention is one for reproducing data recorded in a recording medium, enables switching between a reproduction mode in which image data included in said data is provided as output and a reproduction mode in which image data included in said data is not provided as image data, and switching the reproduction mode according to whether the image data can be provided as output on an image data display section.

The reproducing program according to the present invention makes a computer execute the reproducing method according to the present invention described above.

The reproducing medium according to the present invention records the reproducing program according to the present invention in the computer-readable state.

DETAILED DESCRIPTION OF PREFERRED EMBODIMENT(S)

One example in an embodiment of the present invention is described below with reference to the related drawings. This example shows a reproducing apparatus for reproducing data recorded in a DVD-Audio as a recording medium. The recording medium which is used in this example is not limited to the DVD-Audio, and various types of recoding media may be used.

[Structure of a DVD-Audio Disk]

Figure 1:
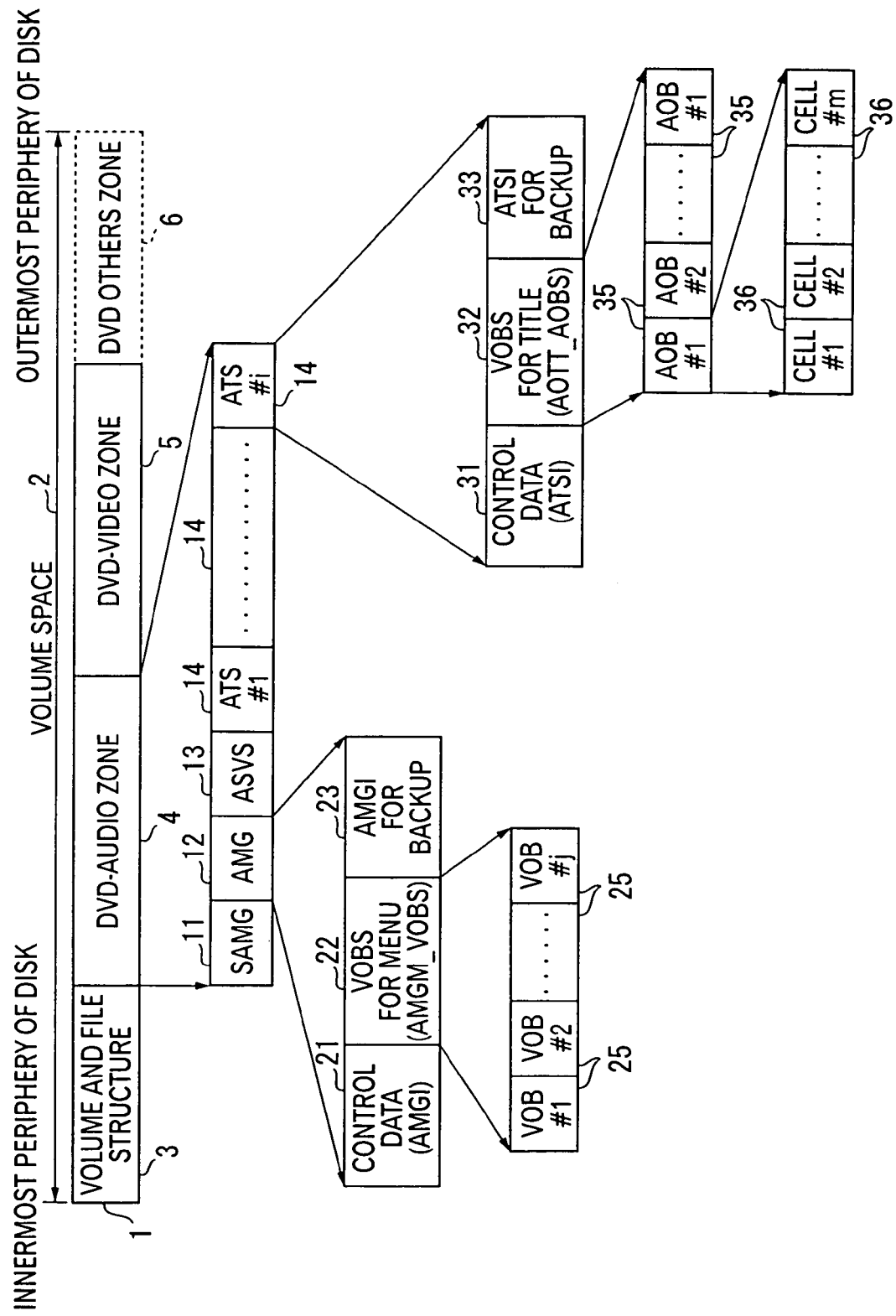
FIG. 1 is a simulated view showing general configuration of a DVD-Audio according to one embodiment of the present invention.
Figure 2:
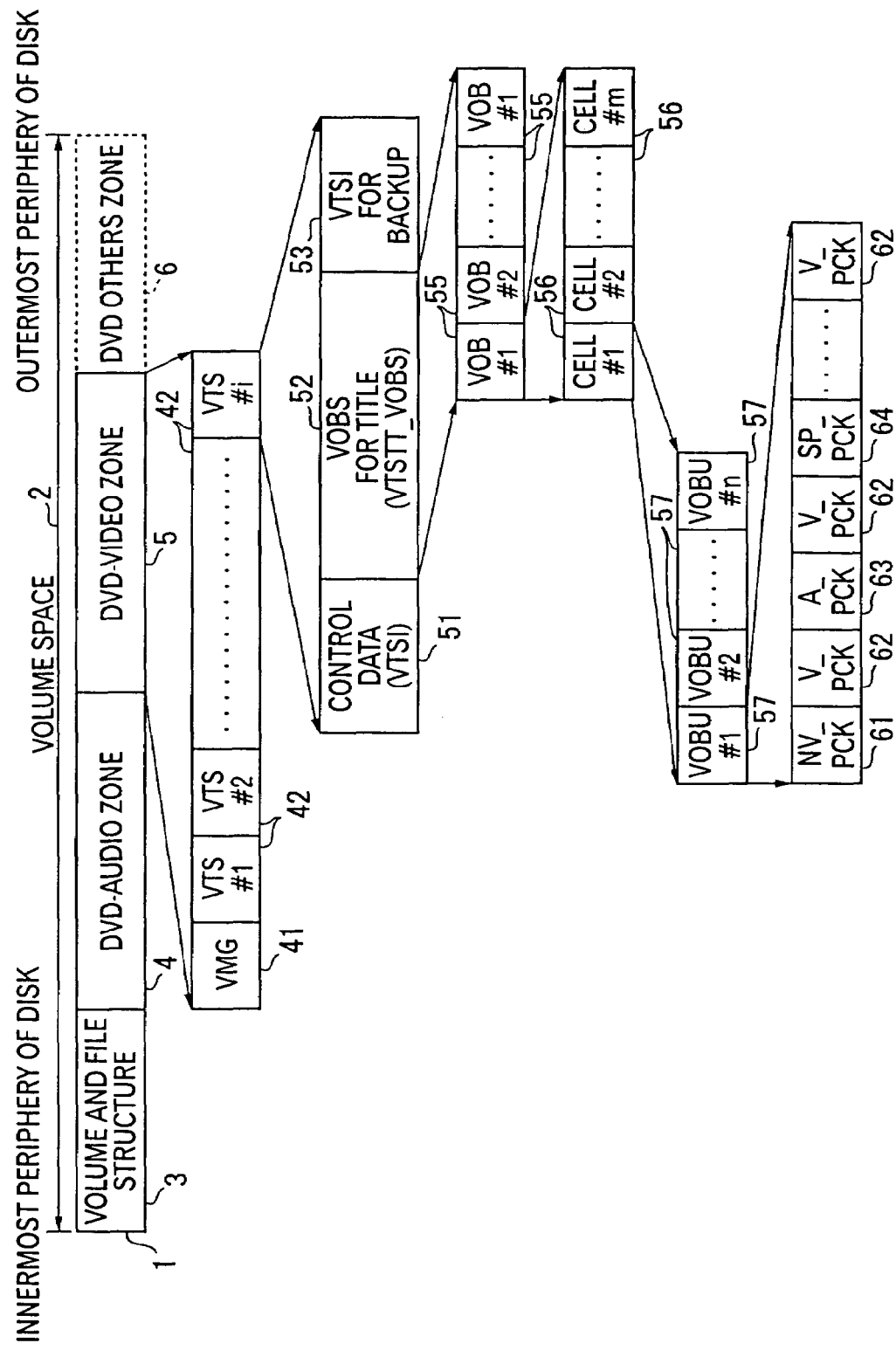
FIG. 2 is a simulated view also showing general configuration of the DVD-Audio according to the embodiment of the present invention.

FIG. 1 and FIG. 2 are simulated views each schematically showing general structure of the DVD-Audio as a recording medium from which data is reproduced with a A DVD-Audio 1 has a disk-like form having a substantially round center hole not shown at its center, one side of which is an information recording surface. Provided on an information recording surface of the DVD-Audio are a read-in area not shown with read-in code indicating a starting end recorded in the innermost peripheral side, and a read-out area not shown with a read-out code indicating a terminating end recorded in the outermost peripheral side. A volume space 2, which is a data recording area, is provided between the read-in area and the read-out area as shown in FIG. 1 and FIG. 2.

Further provided in the volume space 2 are a space for recording therein information concerning a volume and a file structure area (volume and file structure 3), a DVD-Audio zone 4 and a DVD-Video zone 5 each as a space for an application based on the DVD system, and another recording zone 6 (DVD others zone) which is a space for applications based on other systems.

The volume/file structure area 3 corresponds to, or instance, a management area provided in the ISO 9660 as well as in the universal disk format bridge. The contents for having a portion of data described in the DVD-Audio zone 4 stored in a system memory of the reproducing apparatus described later is described in this volume/file structure area 3.

In the other recoding zone 6, other types of information having nothing to do with the data described in the DVD-Video zone 5 can be recorded. This other recording zone 6 is not an essential space, and may not be provided, if it is not necessary.

As shown in FIG. 1, a simple audio manager (described as SAMG hereinafter) 11, an audio manager (described as AMG hereinafter) 12, an audio still video set (described as ASVS hereinafter) 13, and one or more audio title set (described as ATS#1 (i: integral number of 1 up to 99)) 14 are provided in DVD audio zone 4. The ASVS 13 is optional data, and may not be recorded in the DVD-Audio zone 4.

The SAMG 11 is a table showing contents of linear PCM data or lostless-packed PCM data, namely a table indicating whether the data is stereo or monaural, and a basic reproduction menu is described therein. This SANG 11 comprises a plurality of audio reproduction pointer tables not shown.

The AMG 12 comprises an audio manager information (described as AMGI hereinafter, which is control data) file 21, a video object set (described as AMGM_VOBS hereinafter) file 22 for the audio manager menu, and an AGMI file 23 for back-up.

Described in the AMGI file 21 is the contents of a list of data which can be reproduced with VCAP and a list of data which can be reproduced with AOP. More specifically, a search pointer table for searching data is described in the AMGI file 21. This search pointer table comprises search pointer table information for audio titles not shown and used for searching data for VCAP (described as ATT_SRPTI), and search pointer table information for audio-only titles now shown (described as AOTT_SRPTI). Desired data is searched and fetched based on the positional information, namely information indicating a recording position of data to be searched in the DVD-Audio 1.

The AMGM_VOBS file 22 comprises one or more video objects (described as VOB #j (j: integral number)) files 25 each for displaying the menu screen. The VOB#25 is a file in which musical data and image data coexist, and for instance, data for a music regenerated when image data for the menu screen or the menu screen is being displayed is described therein. The AMGI file 23 for back-up stores therein the same contents as those stored in the AMGI file 21, and for instance, even when the information recording surface is physically damaged, the contents stored in the AMGI file 21 can be read out by the reproducing apparatus.

Described in the ASVS 13, sill image data, which is the so-called audio still video reproduced together with the audio data described in each ATS #i 14. This still image data can be reproduced with the VCAP and is ignored by and can not be reproduced with the AOP.

Each ATS #i 14 comprises an audio title set information (described as ATSI hereinafter, which is control data) file 31, an audio object set (described as AOTT_AOBS hereinafter, indicating audio-only title) file 32, and an ATSI file 33 for back-up.

Described in the ATSI file 31 is such data as the contents to be reproduced or the address information of the ASVS 13 for correlating thereto. Contents of the ATSI file 33 are the same as those stored in the ATSI file 31, and for instance, even when the information recording surface is physically damaged, the contents stored in the ASTI file 31 can be read out by the reproducing apparatus.

Figure 3:
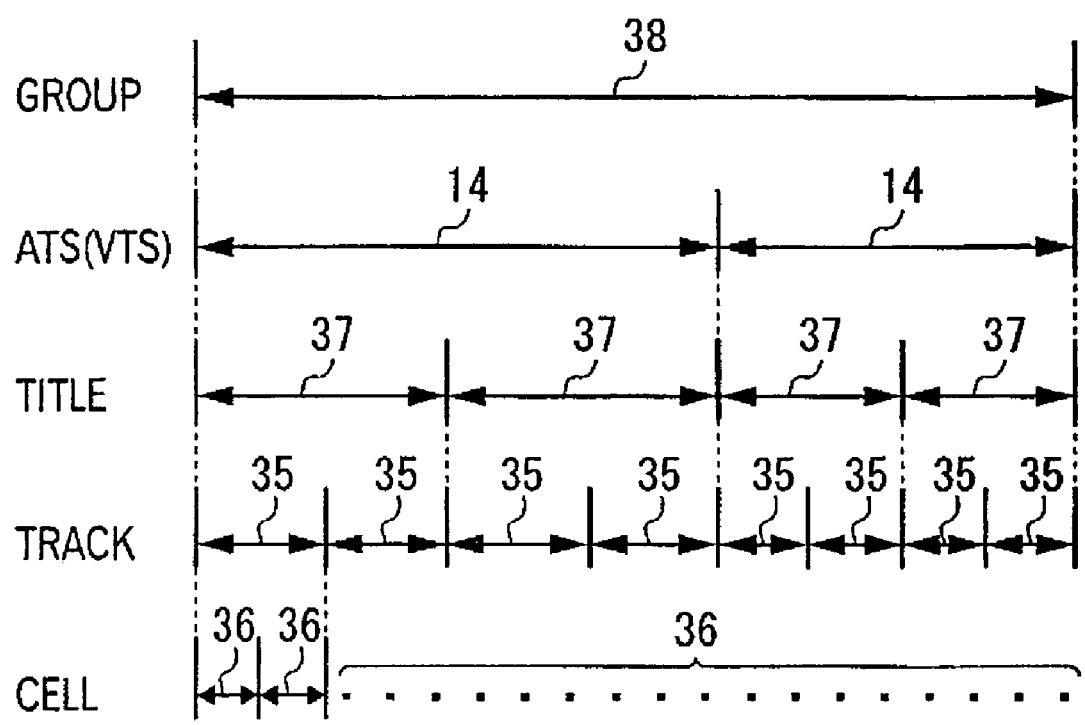
FIG. 3 is a simulated view showing data configuration in the embodiment.

The AOTT_AOBS file 32 comprises one or more audio object (described as AOB #m hereinafter (m: integral number)) files 35. Each AOB #m 35 comprises one or more cells #n 36. A program for the audio title set comprises a group of one or more cells #n 36, and a program chain for the audio title set comprises one or more groups of programs. Namely, as shown in FIG. 3, assuming that one program is a piece of music stored in one track and reproduced therefrom as shown in FIG. 3, the cell #n 36 is the minimum unit for reproduction of the music piece. The title 37 comprises one or more tracks, the AST #i 14 comprises one or more titles 37, and the Croup 38 comprises one or more groups of ATS #i 14.

On the other hand, provided in the DVD-Video zone 5 are, as shown in FIG. 2, a video manager (described as VMG hereinafter) 41, and one or more video title sets (described as VTS #i (i: integral number of up to 99)) 42. It is to be noted that the VMG 41 is an area from which data is read out when reproduced with a DVD-Video player and detailed description thereof is omitted herein.

Each VTS #i 42 comprises a video title set information (described as VTSI hereinafter, which is control data) file 51, a video object set (described as VTSTT_VOBS hereinafter, which is a video set title) file 52, and a VTSI file 53 for back-up.

Described in the VTSI file 51 are, for instance, the contents for reproducing the data described in the VTSTT_VOBS file 52. Further, even when the information recording surface is physically damaged, the reproducing apparatus can read out contents of the VTSI file 51 from the VTSI file 53 for back-up.

The VTSTT_VOBS file 52 comprises one or more video object (described as VOS #1 hereinafter (1: integral number)) files 55. Each VOB #1 55 comprises one or more video title set cells #m (m: integral number) 56. Further each cell #m 56 comprises one or more video object units (described as VOBU #n hereinafter (n: integral number)) file 57. In these VOBSU #n 57, a navigation pack (described as NV_PCK hereinafter, indicating one or more control information) file 61, video pack (described as V_PCK hereinafter, indicating one or more image data) file 62, an audio pack (described as A_PCK hereinafter, indicating one or more musical data) file 63, and a sub-picture pack (described as SP_PCK hereinafter indicates caption data) 64 coexist.

(Configuration of the Reproducing Apparatus)

Configuration of the reproducing apparatus having the structure as described above for reproducing the DVD-Audio 1 is described below with reference to the block diagram shown in FIG. 4.

Figure 4:
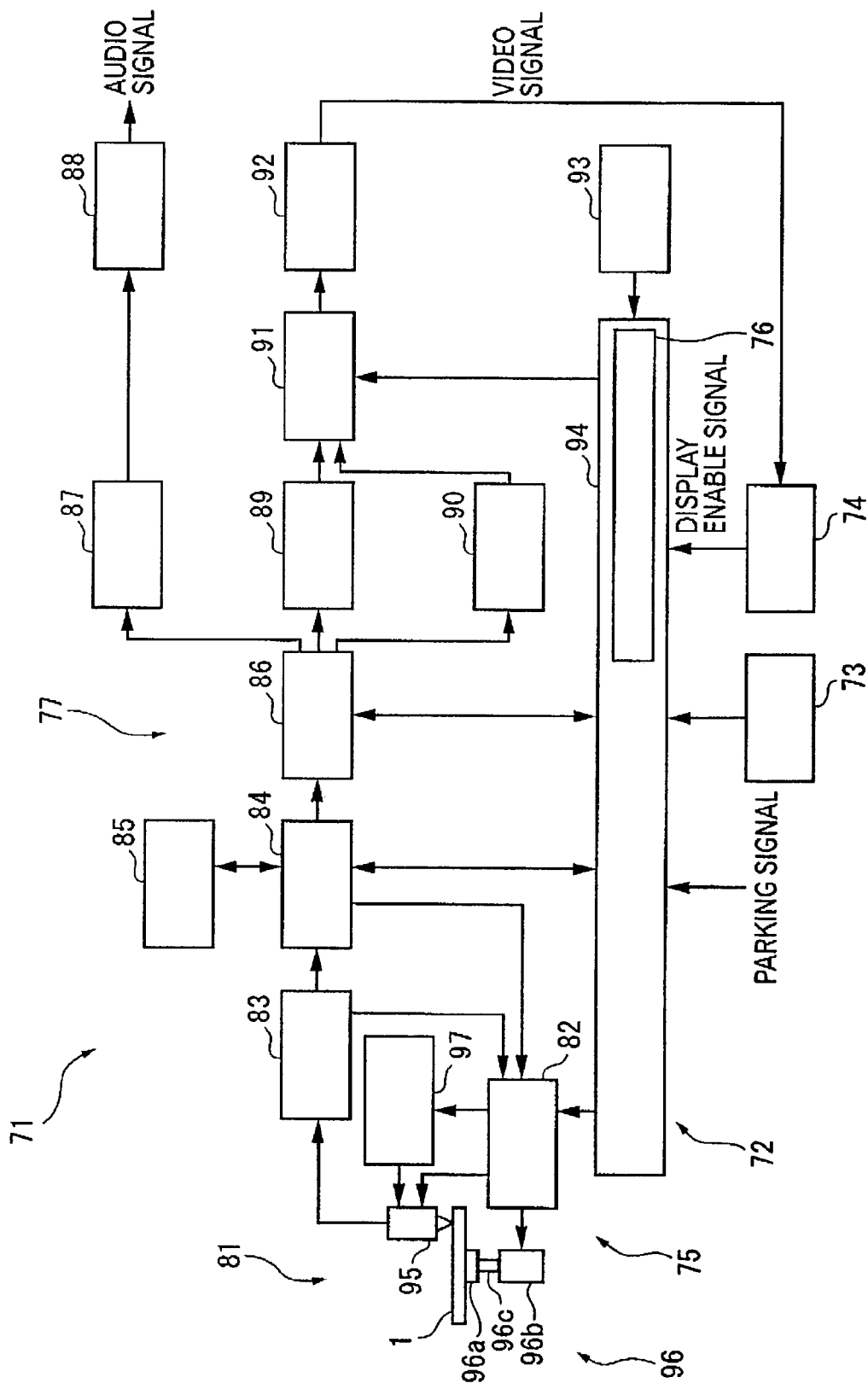
FIG. 4 is a block diagram showing general configuration of a reproducing apparatus according to the embodiment of the present invention.

In FIG. 4, the reference numeral 71 indicates a reproducing apparatus, and this reproducing apparatus 71 has the DVD-Audio 1 installed therein, and reads out data recorded in the DVD-Audio 1 for reproduction.

The reproducing apparatus 71 has, for instance an optical pickup 95. This optical pickup 95 reads out data recorded on the information recording surface of the DVD-Audio 1.

The reproducing apparatus 71 has a rotary driving section 96. This rotary driving section 96 rotates the DVD-Audio 1 set at a specified position of the reproducing apparatus at a constant linear speed or an angular speed. This rotary driving section 96 comprises a turn table 96*a*, a clamper not shown, and a spindle motor 96*b*. The turn table 96*a* engages in a center hole of the DVD-Audio 1, and can rotate the DVD-Audio 1 mounted at a specified position in the reproducing apparatus 1. The damper holds together with the turn table 96*a* the DVD-Audio 1 therebetween. The spindle motor 96*b* rotates and drives the DVD-Audio 1 at a constant linear or angular speed. The spindle motor 96*b* has an output shaft 96*c* provided therein. A tip section of this output shaft 96*c* is linked to the turn table 96*a* with a driving force of the spindle motor 96*b* delivered via the output shaft 96*a* to the turn table c to turn the DVD-Audio 1 at a constant linear or angular speed.

Further the reproducing apparatus 71 has a feed motor 97. This feed motor 97 displaces the optical pickup 95 in parallel to the information recording surface and along the radial direction.

A detecting section not shown for detecting the fact that the DVD-Audio 1 has been set at the specified position is provided in the reproducing apparatus 71.

The reproducing apparatus 71 has a servo control section 82. This servo control section 82 controls rotation of the spindle motor 96*b* to make the DVD-Audio 1 rotate at a constant linear or angular speed. The servo control section 82 controls rotation of the feed motor 97 to displace the optical pickup 95 in parallel to the information recording surface of the DVD-Audio 1 along the radial direction thereof according to the necessity. Further the servo control section 82 controls a focus actuator and a tracking actuator each not shown and provided in the optical pickup 95 to adjust a focal length from a read light reflected from the information recording surface and a focal position on the information recording surface.

Further the reproducing apparatus 71 comprises an RF amplifier 83, a digital signal processing section 84, a RAM (Random Access Memory) 85; a stream separating section 86, an audio decoder 87, a D/A converter 88, a video decoder 89, a sub-picture decoder 90, a video processor 91, a video encoder 92, a ROM (Read Only Memory) 93 for OSD (On-Screen Display) images, and a system controller 94 as a control section for controlling the entire reproducing apparatus 71.

The RF amplifier 83 generates an RF signal by amplifying an electric signal outputted from the optical pickup 95 and subjecting the amplified signal to the prespecified processing with an equalizer. The RF amplifier 83 outputs the generated RF signal to the digital signal processing section 84. The RF amplifier 83 generates a focus error signal and a tracking error signal based on an electric signal outputted from the optical pickup 95, and outputs the signals to the servo control section 82.

The digital signal processing section 84 converts an RF signal outputted from the RF amplifier 83 to a digital signal, and properly subjects the digital signal to the processing for signal demodulation as well as to the processing for error correction according to the data from the DVD-Audio 1. The processed signal is stored in the RAM 85 connected to the digital signal processing section 84. Further the digital signal processing section 84 has the data stored in the RAM 85 outputted to the stream separating section 86 or to the system controller 94 under control by the system controller 94.

The stream separating section 86 analyzes a pack head constituting the VOB #1 55 in which image data and musical data outputted from the digital signal processing section 85 coexist in the mixed state, and separates the A_PCK file 63, a V_PCK file 62, an SP_PCK file 64, and an NV_PCK file 61 from each other. The stream separating section 86 outputs the separated A_PCK file 63 to the audio decoder 87, the V_PCK file to the video decoder 89, the SP_PCK file 64 to the sub-picture decoder 90, and the NV_PCK file 61 to the system controller 94.

The audio decoder 87 subjects the data stored in the A_PCK file 63 and fetched in the stream separating section 86 to the prespecified processing for decoding, and outputs the fetched data to the D/A converter 88. Then the D/A converter 88 converts the decoded data in the A_PCK file 63 to an analog signal to have the data outputted, for instance, from a speaker.

The video decoder 89 and the sub-picture decoder 90 decodes the V_PCK file 62 and the SP_PCK file 64 fetched from the stream separating section 86 to video data and sub-picture data respectively, and also outputs the decoded data to the video processor 91 respectively.

The video processor 91 synthesizes the video data outputted from the video decoder 89, sub-picture data outputted from the sub-picture decoder 90, and the image data for the OSD described below outputted from the system controller 94 with each other according to the instruction from the system controller 94 to generate image data. The generated image data is outputted to the vide encoder 92.

The video encoder 92 converts the image data outputted from the video processor 91 to image data for display. Then the video encoder 92 outputs the converted image data to a monitor 74. The monitor 74 fetches the image data and has the image data displayed on the screen, when the image data can be displayed on the screen.

Stored in the ROM 93 for OSD images is OSD image data used when an input operation is requested to a user, or when the state of the reproducing apparatus 71 is notified to the user. This image data comprises character information which is a still image such as "ATTENTION" or "Enjoy music while driving".

The system controller 94 has an internal memory not shown such as a RAM (Random Access Memory). Various types of programs developed on the OS (Operating System) are recorded for controlling operations of the entire reproducing apparatus 71. The system controller 94 includes, for instance, an image output enabled state detecting section 76 according to the various types of programs recorded in the internal memory.

The image output enabled state detecting section 76 checks whether image output is possible or not to detect the image output enabled state. For instance, the image output enabled state detecting section 76 determines whether image output is possible or not, for instance, by receiving a signal indicating that the monitor 74 is in the state where screen display has been enabled, or by receiving, when the reproducing apparatus 71 is mounted as a navigation device in a vehicle, a signal indicating the parking state of the vehicle.

The system controller 94 provides, with various programs, various typos of controls such as output of various types of servo instructions to the servo control section 82, output of an image generation instruction to the video processor 91 in response to an input operation by the user, analysis of a signal outputted from the digital signal processing section 84 or the stream separating section 86, and control over the processing by the digital signal processing section 84 or by the stream separating section 86.

Connected to the reproducing apparatus 71 are an operating section 73, a monitor 74 as a display section, and a speaker not shown in the figure.

The operating section 73 comprises operation buttons or operation switches not shown and required for operating the reproducing apparatus 71 such as a reproduction key for instructing display of a title, left-right and up-down keys for stream selection. In response to an input operation by a user with any of the operation buttons or operation switches, the operating section 73 outputs a prespecified signal to the system controller 94 in the reproducing apparatus 71 to set contents of the operation required by the user.

The monitor 74 displays the transmitted image data on the screen under controls by the system controller 94 in the reproducing apparatus 71.

[Operations of the Reproducing Apparatus for Processing Data]

Figure 5:
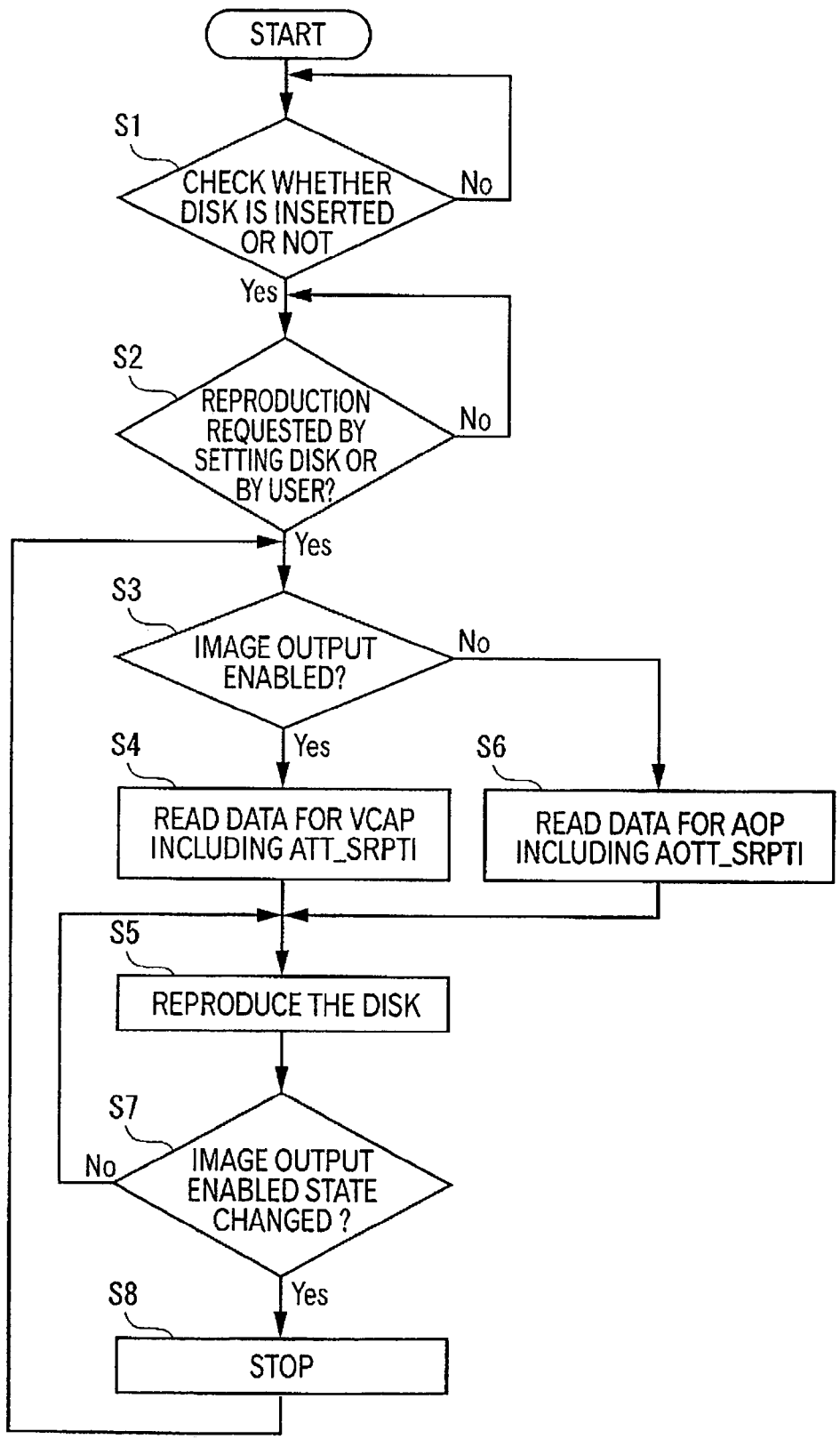
FIG. 5 is a flow chart showing operations of the reproducing apparatus according to the embodiment of the present invention.

The operations of the DVD-Audio for reproduction are described below with reference to the flow chart shown in FIG. 5.

At first, when the DVD-Audio 1 is set on a prespecified position for reproduction (step S1), the system controller 94 drives the feed motor 97 by controlling the servo motor 82 to position a read light from the optical pickup 95 at a position on the innermost periphery of the DVD-Audio 1. Further the system controller 94 starts the spindle motor 96b to turn the DVD-Audio 1 at a constant linear speed.

Then the system controller 94 fetches the information indicating that data recorded in the DVD-Audio 1 is automatically reproduced, or determines whether a request for reproduction of data recorded in the DVD-Audio 1 has been issued in response to an input operation by a user in the operating section 73 or not (step S2). When the system controller 94 recognizes this request for reproduction, the system controller 94 determines whether image output is possible or not (step S3).

In this step S3, the system controller 94 determines whether image output has been enabled or not by checking, for instance, whether power has been turned ON with power supplied to the monitor to enable the screen display or not; whether a monitor based on the pop-up system, in which the monitor can be accommodated within a dashboard of a vehicle, has been projected out from the dashboard to enable the screen display or not; whether a signal indicating that the vehicle's transmission is set in the parking range has been received and the screen display in the parking state has been enabled or not; whether a pulse signal indicating that the vehicle is now running has not been received and the image output allowable only when the vehicle is not running has been enabled or not; or the like.

In this step S3, when it is determined that image output has been enabled, the system controller 94 reads out the ATT_SRPTI in the servo pointer table recorded in the AMGI file 21 of the AMG 12 in the DVD-Audio zone 4. Based on the ATT_SRPTI read out as described above, the system controller 94 reads out the data concerning the VCAP (step S4).

The data read out in his step S4 is subjected to the signal processing or the like according to the necessity with the image data displayed on the screen of the monitor 74 according to the necessity, and also the sound data is outputted, for instance, from a the AMGM_VOSB file 22 in the DVD-Audio zone 4 is read out, if required, with the data displayed, for instance, on the menu screen, and further the system controller 94 demands the user to perform an input operation such as selection of a title to be reproduced.

On the other hand, when it is determined in step S3 that image output has not been enabled, the system controller 94 reads out the AOTT_SRPTI in the servo pointer table recorded in the AMGI file 21 of the AMG 12 in the DVD-Audio zone 4. Based on the AOTT_SRPTI read out as described above, the data concerning the AOP is read out (step S6).

The data read out in step S6 is subjected to the signal processing or the like according to the necessity in step S5, and is outputted from, for instance, a speaker. In the processing for reproduction of the data concerning the AOP, only the limited number of data is successively reproduced, and an input operation to send a request for reproduction or the like is not required in the operating section 73. Namely information concerning a menu requiring an input operation and image data which can not be outputted as images are ignored, and only the reproducible musical data is reproduced.

In the processing for reproduction in step S5, the system controller 94 checks whether the image output enabled state has been effected or not, and also determined whether the current image output enabled state has been changed or not (step S7). In this step S7, when it is determined that the image output enabled state has not been changed, the processing for reproduction in step S5 is continued.

When it is determined in step S7 that the image output enabled state has been changed, the processing for data reproduction is stopped once (step S8). Then the system control returns to step S3, and the system controller 94 checks whether the image output enabled state has been effected or not, and then carries out the data processing corresponding to the state in which the image output enabled state has been effected or to the state in which the image output enabled state has not been effected, namely the processing for reproducing the data for VCAP or AOP according to either one of the two states above. It should be noted that the system control directly returns from step S7 to step S3 without shifting to step S8.

With the embodiment of the present invention the following advantages are provided.

Namely, in this embodiment, based on the determination by the image output enabled state detecting section 76 as to whether the image output enabled state has been effected or not, the data recorded in the DVD-Audio 1 which can be reproduced, the data based on the VCAP system which is reproduced in response to an instruction for reproduction, and the data based on the AOP system which is reproduced regardless of whether an instruction for reproduction is issued or not are selectively read out. Then the data read out as described above is subjected to the processing for reproduction, and is outputted as image data or audio signals according to the necessity.

Because of this feature, data recoded in the DVD)-Audio 1 and based on different systems are selectively read out and reproduced according to a result of determination as to whether the image output enabled state has been effected or not, and therefore, in reproduction of data based on the AOP system in which sometimes such troubles as that a user can not or can hardly visually recognize the output image often occur, such inconveniences as that the user is required to perform an input operation each time the user tries to reproduce the data are eliminated. Further in reproduction of data based on the VCAP system in which a user can visually recognize the image output, recorded data can be reproduced without any restriction, which insures stable and easy reproduction of recorded data. Therefore, with this invention, switching between the VCAP system and the AOP system is automatically executed according to a result of determination as to whether the image output enabled state has been effected or not, so that appropriate data reproduction is executed according to the user's situation, which insures improved convenience in use.

When image output is possible and the user can visually recognize the image output, the processing is carried out for reproduction of data based on the VCAP system which is reproduced according to an instruction for reproduction and can be reproduced without any restriction, all of the recorded data can be reproduced. Further when image output is not possible and the user can not visually recognize the image output, although there are some restrictions in data reproduction, the processing is carried out for reproduction of the data based on the AOP system which is automatically reproduced without any instruction for reproduction, so that an operation for setting an instruction for reproduction is not required and the data is automatically reproduced, which insures improved convenience in data treatment.

Further, automatic switching between the VCAP system and the AOP system carried out according to a result of determination as to whether the image output enabled state has been effected or not is executed according to the state of a movable body such as a vehicle, and because of this configuration, especially when the present invention is applied to a navigation system, appropriate data reproduction is executed in response to the user's situation such as the state in which the vehicle is running and image output is inhibited, or the state in which the vehicle is parking and image output is allowable.

Information concerning guidance for movement is displayed by a guidance device of the navigation system not shown on the monitor 74, and data recorded in the DVD-Audio 1 is reproduced by the reproducing apparatus 71 is outputted as images, so that one unit of the monitor 74 can be used both for movement guidance and for appreciating images and sounds, so that configuration of the navigation system can be simplified.

VARIANTS OF THE EMBODIMENTS

The present invention is not limited to the embodiment described above, and includes the modifications thereof as described below which can be achieved within the scope of the present invention.

In the embodiment described above, the recording medium is the DVD-Audio, but other various types of recording media may be used.

Description of the above invention assumes the case where the data which can be reproduced based on the VCAP system or the data which can be reproduced based on only the AOP system is selectively read out for reproduction, but the data recorded in the recording medium is not limited to the ones described above, and image data and musical data based on any system may be recorded in the recording medium.

Further the determination as to whether image output enabled state has been effected or not may be performed not only in the way described above, but also in other various ways such as by checking whether power has been turned on with the power supplied to the monitor and the screen display has been enabled or not; whether, in the popup system in which a monitor can be accommodated within a dashboard, the monitor has been pushed out from the dashboard and the screen display is possible or not; whether a signal indicating that the vehicle's transmission is in the parking range and that the vehicle is parking has been received and the image output allowable state has been effected or not; whether it can be determined based on a pulse signal indicating a driving state of the vehicle that the vehicle is not running and image output allowable state has been effected or not; whether images such as map information from any other source in the navigation system has been displayed or not.

The present invention is not limited to applications in the fields of acoustic devices or the navigation system, and is applicable to any configuration in which data is selectively read out and reproduced according to a result of determination as to whether the image output enabled state has been effected or not.

The program according to the present invention can be prepared as a computer-readable one, and in that case, the program can be used in various system configurations including the case where the program is used for making a computer reproduce the data recorded in a recording medium installed in the computer according to a result of determination as to whether the image output enabled state has been effected or not. When the present invention is applied to the navigation system, the system configuration is not limited to a case where the reproducing apparatus is mounted on a vehicle, and may be applied in cellular telephone systems.

The present invention is not limited to the one embodiment described above and the variants thereof as described above, and various applications thereof are possible without departing from the scope of the present invention.

What is claimed is:

1. A reproducing apparatus for reproducing data recorded in a recording medium comprising:
a control section capable of switching between the processing for reproduction of image data included in said data is outputted and the processing for reproduction in which image data included in said data is not outputted, the processings being switched according to whether electric power is supplied to a display or not.

2. The reproducing apparatus according to claim 1, wherein said data includes not only image data, but also musical data; both said image data and said musical data are outputted in the processing for reproduction of said image data; and only said musical data is outputted in the processing for reproduction in which output of said image data is inhibited.

3. The reproducing apparatus according to claim 1, wherein the processing for reproduction in which said image data is outputted is executed based on the VACP (Video Capable Audio Player) system; and the processing for reproduction in which output of said image data is inhibited is executed based on the AOP (Audio Only Player) system.

4. A reproducing method for reproducing data recorded in a recording medium, wherein switching between the processing for reproduction in which image data included in said data is outputted and the processing for reproduction in which the image data included in said data is not outputted is possible, and the processing mode for reproduction is switched according to a result of determination as to whether electric power is supplied to a display or not.

5. A reproducing program stored in a computer-readable recording medium, the program making a computer execute a reproducing method, wherein switching between the processing for reproduction in which image data included in said data is outputted and the processing for reproduction in which the image data included in said data is not outputted is possible, and the processing mode for reproduction is switched according to a result of determination as to whether electric power is supplied to a display or not.

6. A recording medium storing a reproducing program in a computer-readable manner, wherein the reproducing program is for making a computer execute a reproducing method, wherein switching between the processing for reproduction in which image data included in said data is outputted and the processing for reproduction in which the image data included in said data is not outputted is possible, and the processing mode for reproduction is switched according to a result of determination as to whether electric power is supplied to a display or not.

7. A reproducing apparatus for reproducing data recorded in a recording medium, the reproducing apparatus being installed on a movable body, the reproducing apparatus comprising:

a control section capable of switching between the processing for reproduction of image data included in said data is outputted and the processing for reproduction in which image data included in said data is not outputted, the processings being switched according to whether a display capable of being housed in a housing of the movable body projects out of the housing or not.

* * * * *